US009113030B2

(12) United States Patent
Ni et al.

(10) Patent No.: US 9,113,030 B2
(45) Date of Patent: Aug. 18, 2015

(54) MULTIMEDIA-ENHANCED EMERGENCY CALL SYSTEMS

(71) Applicant: Verizon Patent and Licensing Inc., Arlington, VA (US)

(72) Inventors: James J. Ni, Westford, MA (US); Elliot G. Eichen, Arlington, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 60 days.

(21) Appl. No.: 13/950,373

(22) Filed: Jul. 25, 2013

(65) Prior Publication Data

US 2015/0029296 A1 Jan. 29, 2015

(51) Int. Cl.
*H04L 12/66* (2006.01)
*H04N 7/14* (2006.01)
*H04L 29/06* (2006.01)
*H04M 3/51* (2006.01)

(52) U.S. Cl.
CPC ............ *H04N 7/148* (2013.01); *H04L 65/1016* (2013.01); *H04L 65/1073* (2013.01); *H04M 3/5166* (2013.01)

(58) Field of Classification Search
USPC ................. 379/37, 45; 370/352, 401; 709/227
See application file for complete search history.

(56) References Cited

U.S. PATENT DOCUMENTS

| 8,861,692 | B1 * | 10/2014 | Phelps et al. | 379/121.01 |
| 2014/0126714 | A1 * | 5/2014 | Sayko | 379/265.09 |
| 2014/0126715 | A1 * | 5/2014 | Lum et al. | 379/265.09 |
| 2014/0219167 | A1 * | 8/2014 | Santhanam et al. | 370/328 |
| 2014/0222957 | A1 * | 8/2014 | Gangadharan et al. | 709/217 |
| 2014/0293046 | A1 * | 10/2014 | Ni | 348/143 |
| 2014/0325078 | A1 * | 10/2014 | Shan et al. | 709/227 |
| 2014/0344169 | A1 * | 11/2014 | Phelps et al. | 705/304 |
| 2015/0023484 | A1 * | 1/2015 | Ni et al. | 379/88.18 |

OTHER PUBLICATIONS

Bergkvist, et al., "WebRTC 1.0: Real-time Communication Between Browsers; W3C Editor's Draft," Jun. 3, 2013 (available at http://dev.w3.org/2011/webrtc/editor/webrtc.html).
Sandgren, et al., "WebRTC Interworking with Traditional Telephony Services," Feb. 22, 2012 (available at http://labs.ericsson.com/blog/webrtc-interworking-with-traditional-telephony-services).

* cited by examiner

*Primary Examiner* — Creighton Smith

(57) ABSTRACT

A gateway device may be configured to receive, from a first user device, a request to establish a Web Real-Time Communications ("WebRTC") call session; establish, based on the request, a first WebRTC call session with the user device; establish, based on the request: a voice call session between the gateway device and an Internet Protocol Multimedia Subsystem ("IMS") core, and a second WebRTC call session between the gateway device and a WebRTC portal server; and facilitate, via the established voice call session and the established first and second WebRTC call sessions, multimedia communication connectivity between the first user device and a set of devices that include: a public-switched telephone network ("PSTN") terminal device, and a second user device.

20 Claims, 10 Drawing Sheets

MULTIMEDIA-ENHANCED EMERGENCY CALL SYSTEMS

BACKGROUND

Public-safety answering points ("PSAPs") are call centers that are responsible for answering emergency calls, such as "9-1-1" calls. These calls may be placed when an emergency occurs, and police, firefighters, or medical services are desired. PSAPs traditionally receive voice calls over the public switched telephone network ("PSTN"), which may provide reliable, high-quality connectivity. Due to the technological limitations of the PSTN, voice calls may be the only type of communications that users may use when calling a PSAP. Furthermore, due to regulations or reliability concerns, it may be unfeasible for a PSAP to replace its PSTN connectivity with another type of communication technology (e.g., an Internet protocol ("IP")-based technology).

Present day user devices, such as smart phones, are able to send and receive multimedia calls (e.g., voice and video calls). Certain technologies exist in order to facilitate the efficiency and/or user experience of such multimedia calls, such as the Web Real-Time Communications ("WebRTC") application programming interface ("API"). Since PSAPs generally need to retain their PSTN connectivity, PSAPs may not be capable of placing or receiving multimedia calls.

DETAILED DESCRIPTION OF PREFERRED EMBODIMENTS

The following detailed description refers to the accompanying drawings. The same reference numbers in different drawings may identify the same or similar elements.

Techniques described herein may allow for enhanced communication between users who have diverse types of devices with various communication capabilities. Such techniques may be useful in situations where a call participant desires to retain traditional communication connectivity, while adding more full-featured communication techniques as well. For instance, such a situation may occur where an operator of a PSAP may desire to retain voice connectivity for the PSAP via the PSTN, but also to allow the PSAP to carry out multimedia calls (e.g., video calls, voice and video calls, or other types of multimedia calls). As described in more detail below, some implementations may allow such a PSAP to add additional devices, which may be capable of carrying out multimedia calls, without replacing PSTN communication techniques. In some implementations, for example, the PSAP may receive a voice portion of a call simultaneously via the PSTN and a multimedia portion (e.g., a video portion, or video and voice portions) of the call via another network (e.g., the Internet).

Figure 1:
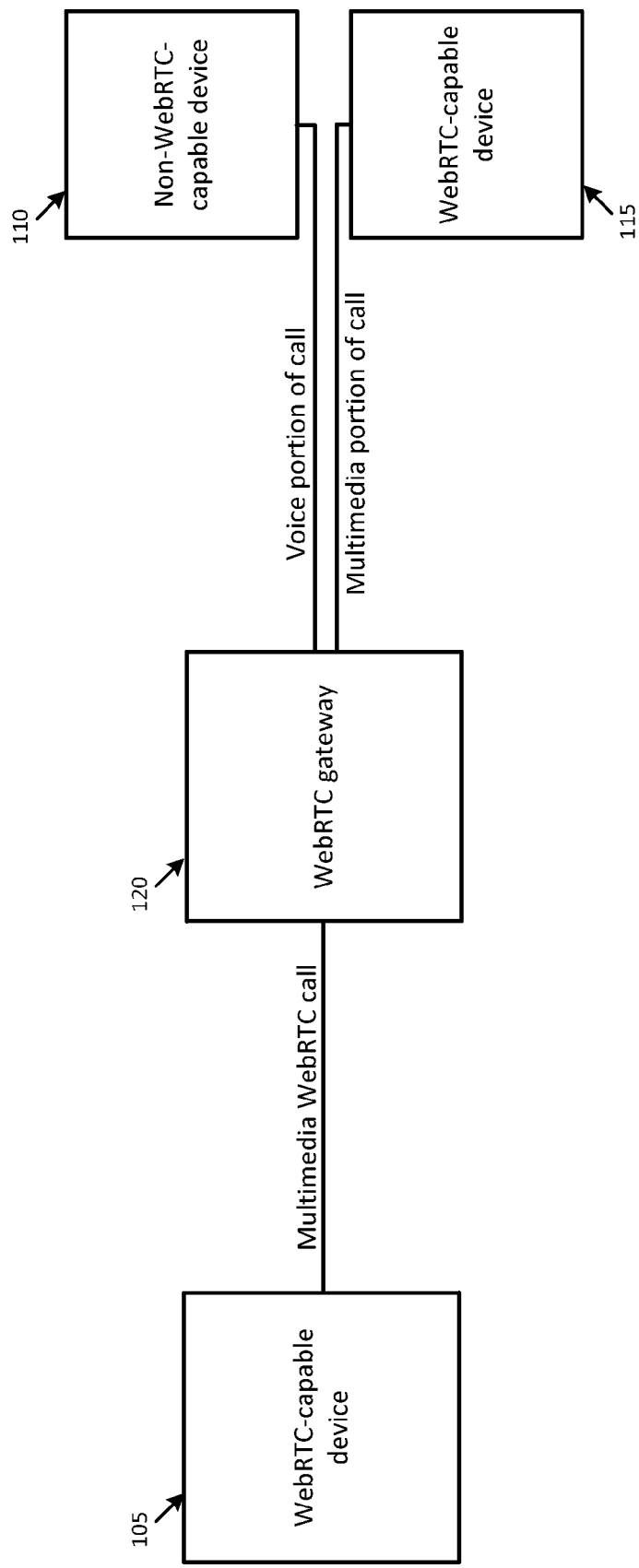
FIG. 1 illustrates an overview of one or more example implementations described herein.

As shown in FIG. 1, for example, assume that a user of device 105, which is capable of placing and receiving multimedia calls using the WebRTC API, wishes to place a multimedia emergency call to a PSAP (e.g., by dialing "9-1-1"). For instance, the user may desire to place a call, which includes video, in order to show the scene of an accident to an emergency responder or an operator at the PSAP. Further assume that the PSAP includes non-WebRTC-capable device 110, and WebRTC-capable device 115. Device 110 may correspond to, for instance, a traditional landline telephone, while device 115 may correspond to, for instance, a desktop workstation computer which is configured to communicate via the WebRTC API.

In accordance with some implementations described herein, the call may be routed from the user's device 105 to WebRTC gateway 120. As described further below, based on a multimedia call received from device 105, WebRTC gateway 120 may facilitate the placing of a voice call, on the behalf of device 105, to device 110 via the PSTN. WebRTC gateway 120 may additionally facilitate the placing of a multimedia call, on the behalf of device 105, to device 115 (e.g., via the Internet). Once the calls are established, WebRTC gateway 120 may split multimedia signals, received from device 105, into a voice portion (for transmitting to device 110) and a multimedia portion (for transmitting to device 115). Similarly, WebRTC gateway may combine a voice portion (received from device 110) and a multimedia portion (received from device 115) into a multimedia call, for transmitting to device 105.

Figure 2:
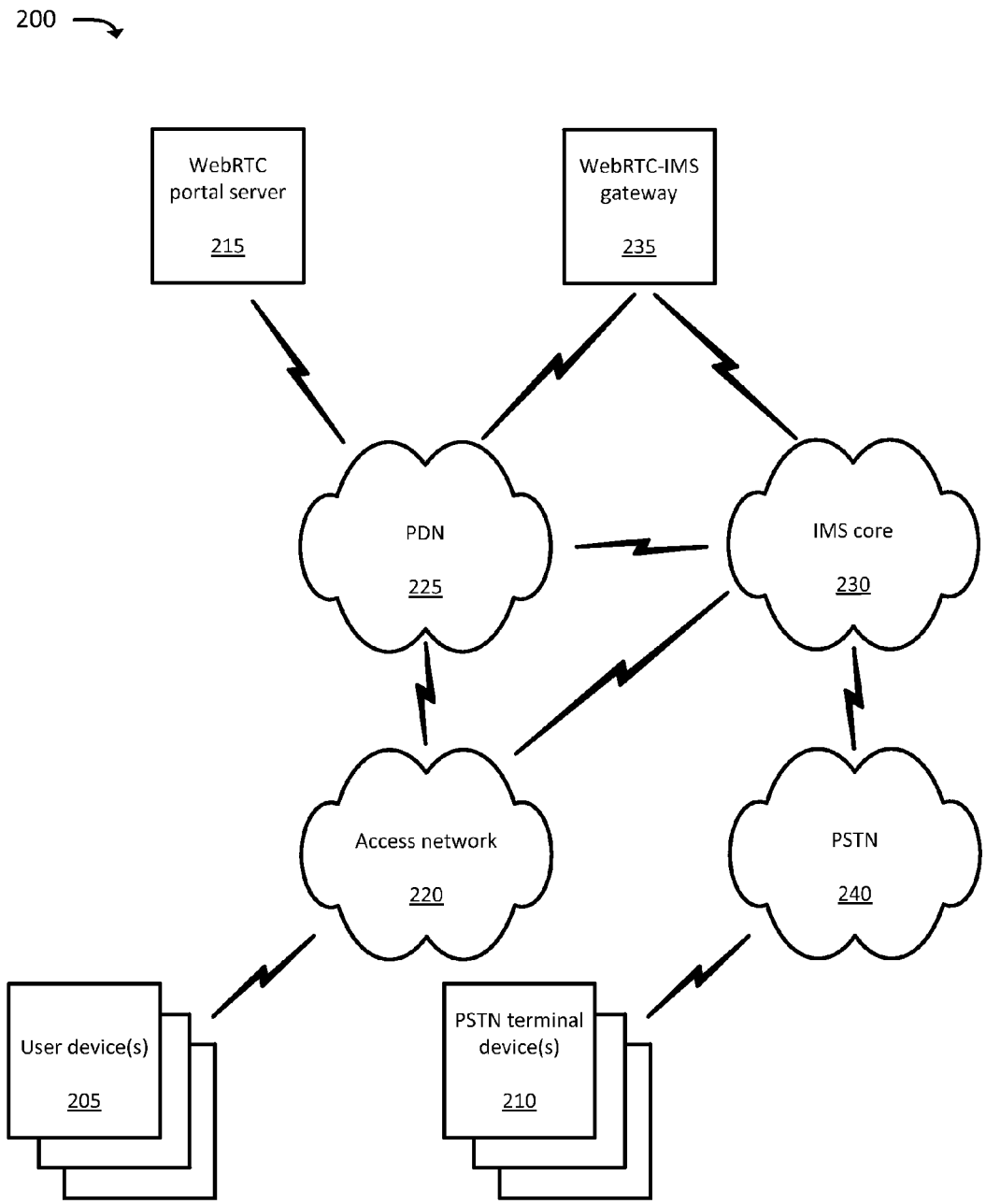
FIG. 2 illustrates an example environment in which systems and/or methods, described herein, may be implemented.

FIG. 2 illustrates an example environment 200, in which systems and/or methods described herein may be implemented. As shown in FIG. 2, environment 200 may include one or more user devices (hereinafter referred to collectively as "user devices 205," or individually as "user device 205"), one or more PSTN terminal devices (hereinafter referred to collectively as "PSTN terminal devices 210," or individually as "PSTN terminal device 210"), WebRTC portal server 215, access network 220, packet data network ("PDN") 225, IP Multimedia Subsystem ("IMS") core 230, WebRTC-IMS gateway 235, and PSTN 240. The quantity of devices and/or networks, illustrated in FIG. 2, is provided for explanatory purposes only. In practice, there may be additional devices and/or networks; fewer devices and/or networks; different devices and/or networks; or differently arranged devices and/or networks than illustrated in FIG. 2. Alternatively, or additionally, one or more of the devices of environment 200 may perform one or more functions described as being performed by another one or more of the devices of environment 200.

Devices of environment 200 may interconnect via wired connections, wireless connections, or a combination of wired and wireless connections.

User device 205 may include any computation and communication device that is capable of directly or indirectly communicating with one or more networks, such as PDN 225, IMS core 230, and/or PSTN 240. In some implementations, user device 205 may communicate with PDN 225, IMS core 230, or PSTN 240 via one or more access networks, such as access network 220. User device 205 may include, for example, a desktop computer, a laptop computer, a radiotelephone, a personal communications system ("PCS") terminal (e.g., a device that combines a cellular radiotelephone with data processing and data communications capabilities), a personal digital assistant ("PDA") (e.g., that can include a radiotelephone, a pager, Internet/intranet access, etc.), a smart phone, a tablet computer, a camera, a personal gaming system, or another type of computation and communication device.

In some implementations, user device 205 may be capable of carrying out communications (e.g., voice over Internet protocol ("VoIP") calls, video calls, and/or other types of communications) by communicating with other devices via PDN 225 and/or IMS core 230. These communications may include multimedia calls, which may include a video portion and/or a voice portion. In some such implementations, the multimedia call may be carried out by user device 205 by using a WebRTC API (e.g., as provided for by the World Wide Web Consortium ("W3C"), in the technical document by Bergkvist et al., "WebRTC 1.0: Real-time Communication Between Browsers—W3C Editor's Draft 3 Jun. 2013"). In some implementations, the multimedia call may be carried out using additional or different standards, APIs, and/or protocols. For instance, the WebRTC communications may be sent and/or received by user device 205 via a Session Initiation Protocol ("SIP") and/or a Real-time Transport Protocol ("RTP") connection with WebRTC portal server 215 and/or WebRTC-IMS gateway 235.

PSTN terminal device 210 may include a communication device that is capable of directly or indirectly communicating with one or more other devices via PSTN 240. In some implementations, PSTN terminal device 210 may include, for example, a landline telephone device, and/or another device that is capable of carrying out voice communications with other devices via PSTN 240.

WebRTC portal server 215 may include any computation and communication device that provides a web-based multimedia portal to one or more user devices 205. As will be further described, WebRTC portal server 215 may receive a multimedia portion of a call from one particular user device 205 (e.g., via PDN 225 and/or one or more other networks), and may provide the multimedia portion of the call to another user device 205.

Access network 220 may include one or more wired and/or wireless networks, via which user device 205 may communicate with other networks (such as with PDN 225). Access network 220 may, in some implementations, include a radio access network ("RAN") that is associated with an evolved packet system ("EPS") that includes a LTE network and/or an evolved packet core ("EPC") network that operate based on a Third Generation Partnership Project ("3GPP") wireless communication standard. The RAN may include one or more base stations, some or all of which may take the form of an evolved node B ("eNB"), via which user device 205 may communicate with the EPC network. The EPC network may include one or more serving gateways ("SGWs"), PDN gateways ("PGWs"), and/or mobility management entities ("MMEs"), and may enable user device 205 to communicate with PDN 225 and/or IMS core 230. In some implementations, access network 220 may additionally, or alternatively, include other types of networks, such as a wired Local Area Network ("LAN"), a wireless LAN, and/or another type of network.

PDN 225 may include one or more wired and/or wireless networks. PDN 225 may include, for example, a wide area network ("WAN") such as the Internet, or one or more other packet-switched networks. User device 205 may connect, through PDN 225, to other networks, data servers, application servers, or other servers/applications that are coupled to PDN 225. PDN 225 may, in some implementations, be an IP-based network.

IMS core 230 may include one or more computation and communication devices that implement IMS functionality of a LTE network. IMS core 230 may include, for example, one or more Call Session Control Function ("CSCF") devices, a Home Subscriber Server/Authentication, Authorization, and Accounting ("HSS/AAA") server, and/or other devices. The CSCF may facilitate the establishment and de-establishment of media sessions. The CSCF may communicate with devices outside of IMS core 230 using, for example, SIP and/or Message Session Relay Protocol ("MSRP") messages. The HSS/AAA server may assist in the provisioning of network resources for IMS subscribers and IMS-based services.

WebRTC-IMS gateway 235 may include any computation and communication device that facilitates communication between user device 205, PSTN terminal device 210, WebRTC portal server 215, and IMS core 230. As further described below, WebRTC-IMS gateway 235 may split multimedia calls into voice and multimedia portions, and/or may combine voice and multimedia portions of a call into a multimedia call. In some implementations, WebRTC-IMS gateway 230 may translate messages, sent from user device 205 to IMS core 230, from WebRTC messaging to a messaging protocol that is supported by IMS core 230 (e.g., SIP and/or MSRP), and vice versa. In some implementations, WebRTC-IMS gateway 230 may be incorporated as part of IMS core 230, may connect to IMS core 230 via PDN 225, or may communicate with IMS core 230 in another fashion.

While one WebRTC-IMS gateway 235 is shown in FIG. 2, in practice, multiple WebRTC-IMS gateways may be used. For instance, a first WebRTC-IMS gateway 235 may receive a WebRTC communication, may translate some or all of the WebRTC communication to a SIP and/or a MSRP communication, and may forward the SIP and/or the MSRP communication to IMS core 230. A different WebRTC-IMS gateway 235 may receive the SIP and/or the MSRP communication from IMS core 230, may translate the received communication to WebRTC, and may forward the WebRTC communication to another device.

PSTN 240 may include a circuit-switched network that allows for communication between devices. For instance, PSTN 240 may allow for communication between PSTN terminal devices 210 and other PSTN terminal devices 210 and/or other networks (e.g., IMS core 230).

Figure 3:
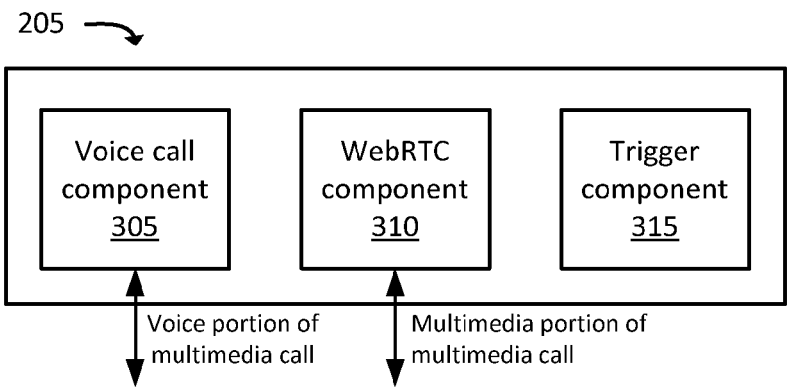
FIGS. 3-5 illustrate example functional components of one or more of the devices shown in FIG. 2.
Figure 4:
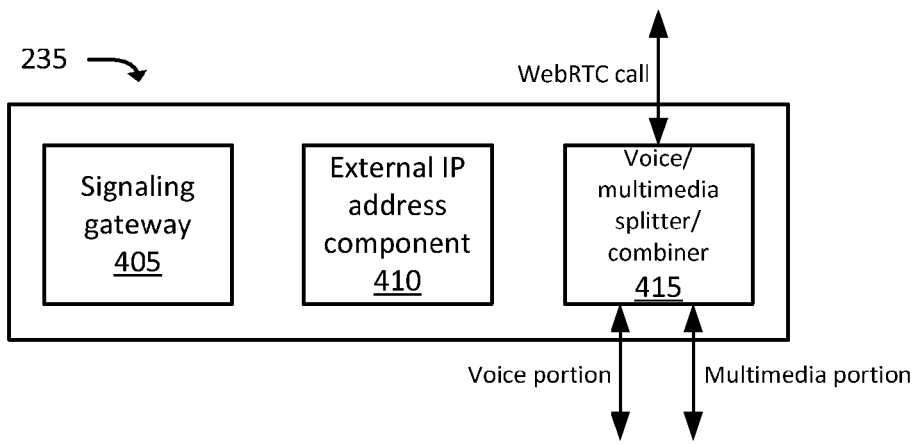
Figure 5:
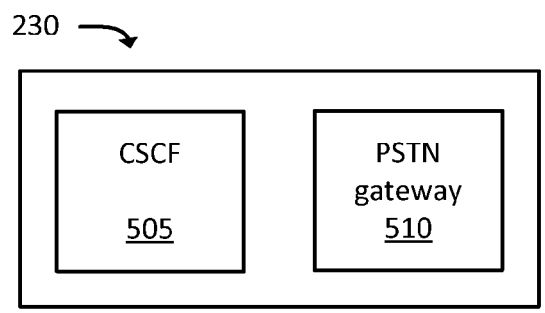

FIGS. 3-5 illustrate example functional components of one or more of the devices shown in FIG. 2. For instance, FIG. 3 illustrates an example user device 205, FIG. 4 illustrates an example WebRTC-IMS gateway 235, and FIG. 5 illustrates an example IMS core 230. Although these example devices are shown as a single device in these figures, in practice, some of the functionality performed by one or more of these devices may be performed by multiple different devices. For example, some of the functionality, described below with respect to user device 205, may be performed by two different devices (e.g., two different user devices 205, one user device 205 and another device, etc.). Furthermore, in some implementations, one or more of the devices shown in FIGS. 3-5 may include additional, fewer, different, or differently arranged components.

As shown in FIG. 3, example user device 205 may include voice call component 305, WebRTC component 310, and trigger component 315. Voice call component 305 may include circuitry and/or software that allows user device 205 to send and/or receive voice communications (e.g., a voice call, or a voice portion of a multimedia call). For example, voice call component 305 may include a wireless radio (e.g., a LTE radio, a wireless LAN ("WLAN") radio, a Bluetooth radio, and/or another type of radio) that allows user device 205 to communicate, via access network 220, with IMS core 230 and/or PSTN 240. In some implementations, the voice calls placed or received by voice call component 305 may be VoIP calls.

WebRTC component 310 may include circuitry and/or software that allows user device 205 to send and/or receive multimedia communications (e.g., communications that include video, video and voice, chat, and/or other types of multimedia communications). In some implementations, WebRTC component 310 may allow user device 205 to communicate via a WebRTC API, which may be implemented over a RTP connection with, for example, WebRTC portal server 215 and/or WebRTC-IMS gateway 235.

Trigger component 315 may include circuitry and/or software that notifies WebRTC component 310 when a voice call is initiated by, or received by, voice call component 305. For instance, assume a user of user device 205 places a call using voice call component 305. Trigger component 315 may notify WebRTC component 310 that a call was placed by voice call component 305, and may cause WebRTC component 310 to place a corresponding multimedia call (e.g., a WebRTC call).

As shown in FIG. 4, example WebRTC-IMS gateway 235 may include signaling gateway 405, external IP address component 410, and voice/multimedia splitter/combiner 415. Signaling gateway 405 may include circuitry and/or hardware that allows WebRTC-IMS gateway 235 to notify IMS core 230 of various types of calls (e.g., voice calls and multimedia calls), which may facilitate the establishment of communication channels for these calls. In some implementations, signaling gateway 405 may communicate with IMS core 230 using SIP and/or other protocols, and may communicate with user devices 205 and/or WebRTC portal server 215 using SIP and/or Representational State Transfer ("REST") protocol and/or other protocols.

External IP address component 410 may include circuitry and/or hardware that allows a querying device (e.g., user device 205) to receive information regarding an externally visible IP address and/or port of the querying device. External IP address component 410 may use Session Traversal Utilities for Network Address Translation ("STUN"), Interactive Connectivity Establishment ("ICE"), and/or Traversal Using Relays around NAT ("TURN") techniques in order to determine an externally visible IP address and/or port of the querying device. As described below, a particular user device 205 may, in some implementations, use its externally visible IP address and port when establishing a WebRTC call.

Voice/multimedia splitter/combiner 415 may include circuitry and/or hardware that splits a multimedia call into component portions. For instance, assume that WebRTC-IMS gateway 235 receives a WebRTC call, that includes a video portion and a voice portion, from user device 205. Voice/multimedia splitter/combiner 415 may establish a WebRTC connection with a destination (e.g., a particular WebRTC portal server 215 that is associated with an indicated callee of the WebRTC call), and may also establish a PSTN call with a destination (e.g., a particular PSTN terminal device 210 that is associated with the indicated callee).

In some implementations, voice/multimedia splitter/combiner 415 may transcode WebRTC communications (or portions of WebRTC communications) using certain types of audio/video codecs, to other types of communications, using different types of audio/video codecs. Similarly, voice/multimedia splitter/combiner 415 may transcode non-WebRTC communications to WebRTC communications. In some implementations, voice/multimedia splitter/combiner 415 may combine multiple different communications (e.g., a non-WebRTC voice communication and a WebRTC video communication, a non-WebRTC voice communication and a non-WebRTC video communication, or other combinations of types of communications) into a single WebRTC communication. When combining different communications, voice/multimedia splitter/combiner 415 may perform a syncing and or buffering operation to ensure that different portions are properly combined (e.g., that voice in the combined communication is synced with video in the combined communication). For example, voice/multimedia splitter/combiner 415 may sync the voice and video, in the combined communication, based on timestamps associated with the respective received voice and multimedia communications.

As shown in FIG. 5, example IMS core 230 may include CSCF 505 and PSTN gateway 510. CSCF 505 may communicate with devices inside and/or outside of IMS core 230 using, for example, SIP and/or MSRP messages. For instance, CSCF 505 may receive messages from signaling gateway 405 of WebRTC-IMS gateway 235, indicating that a voice call and/or a multimedia call should be established. CSCF 505 may facilitate the establishment of these calls by, for example, sending set up messages to WebRTC-IMS gateway 235 and/or PSTN gateway 510. These setup messages may include, for instance SIP INVITE messages, SIP ACK messages, and/or other setup messages.

PSTN gateway 510 may interwork signaling and transcode voice communications (e.g., voice communications received from user device 205 and/or from WebRTC-IMS gateway 235) into PSTN signaling and voice communications, which may be delivered to PSTN terminal device 210 via PSTN 240. Similarly, PSTN gateway 510 may interwork PSTN signaling and transcode PSTN voice communications, received from PSTN terminal device 210, into other types of signaling (e.g., SIP) and communications (e.g., RTP communications), for delivery to user device 205 and/or another device. In some implementations, PSTN gateway 510 may perform PSTN signaling based on other types of signaling (e.g., SIP signaling). For instance, PSTN gateway 510 may receive an SIP INVITE message (indicating a telephone number associated with PSTN terminal device 210), and may output a message (e.g., an initial address message ("IAM")) to initiate a PSTN call to PSTN terminal device 210.

Figure 6:
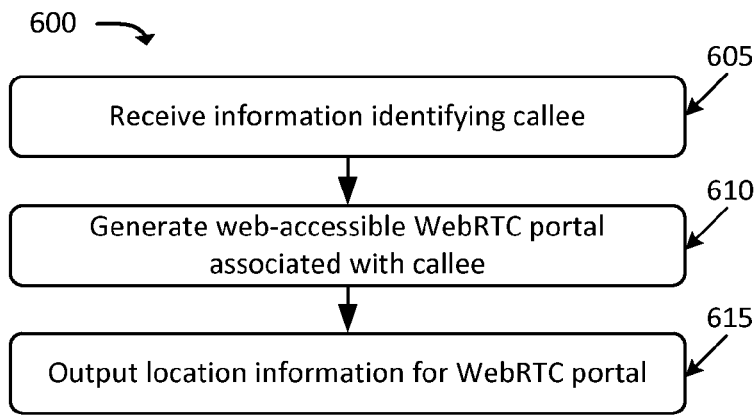
FIG. 6 illustrates an example process for generating a WebRTC portal page for a callee.

FIG. 6 illustrates an example process 600 for generating a WebRTC portal page for a callee. In one example implementation, process 600 may be performed by WebRTC portal server 215. In other implementations, some or all of process 600 may be performed by one or more other devices in lieu of, or in conjunction with, WebRTC portal server 215.

Process 600 may include receiving information identifying a callee (block 605). For instance, WebRTC portal server 215 may receive information regarding a callee, for whom a WebRTC portal should be generated. In general, this information may be received as part of a registration process for a callee who may wish to augment the callee's communication capabilities. For example, a PSAP, which is associated with PSTN communications, may desire to add WebRTC capability to the PSAP's facilities. To this end, a user, such as an administrator associated with the PSAP, may register the PSAP with WebRTC portal server 215. The information (received at block 605) may include, for example, a telephone number (e.g., a 10-digit PSTN telephone number, a 7-digit PSTN telephone number, a 3-digit PSTN emergency telephone number, etc.). In some implementations, the information regarding the callee may include additional, or different, information identifying the callee.

Process 600 may also include generating a web-accessible WebRTC portal associated with the callee (block 610). For instance, WebRTC portal server 215 may generate or execute server-side code (e.g., server-side JavaScript code, server-side Personal Home Page ("PHP") code, etc.) that allows for WebRTC calls be sent and received. The WebRTC portal may be associated with a network location identifier (e.g., an IP address, a uniform resource locator ("URL"), or another network location identifier), which may be accessed by a particular user device 205 (e.g., a user device associated with the callee). In some implementations, when the WebRTC portal is accessed by user device 205, WebRTC portal server 215 may provide a web page to user device 205, which includes client-side code (e.g., client-side JavaScript code, client-side PHP code, etc.), which may allow user device 205 to communicate with WebRTC portal server 215 to send and receive WebRTC calls. In some implementations, user device 205 may execute a software application, such as a WebRTC-enabled web browser, in order to run the client-side code.

In some implementations, before generating (at block 610) the web-accessible WebRTC portal, WebRTC portal server 215 may perform an authentication procedure to verify that the request (received at block 605) is genuine. For instance, in some implementations, WebRTC portal server 215 may place an automated call, using interactive voice response ("IVR"), to the callee in order to verify that the callee desires to register for an enhanced call service. In some situations, WebRTC portal server 215 may require heightened authentication, based on the type of callee. For instance, if the callee is a PSAP with a 3-digit emergency PSTN telephone number, WebRTC portal server 215 may require manual verification from an administrator of WebRTC portal server 215.

Process 600 may additionally include outputting location information for the WebRTC portal. For instance, WebRTC portal server 215 may output the location identifier (e.g., the above-mentioned IP address or URL) to the callee. As discussed above, the callee may access the WebRTC portal using this location identifier in order to send or receive multimedia calls using WebRTC. In some implementations, WebRTC portal server 215 may output information to WebRTC-IMS gateway 235, indicating that the callee is associated with the WebRTC portal. WebRTC-IMS gateway 235 may use this information when routing calls to and/or from the callee.

Figure 7:
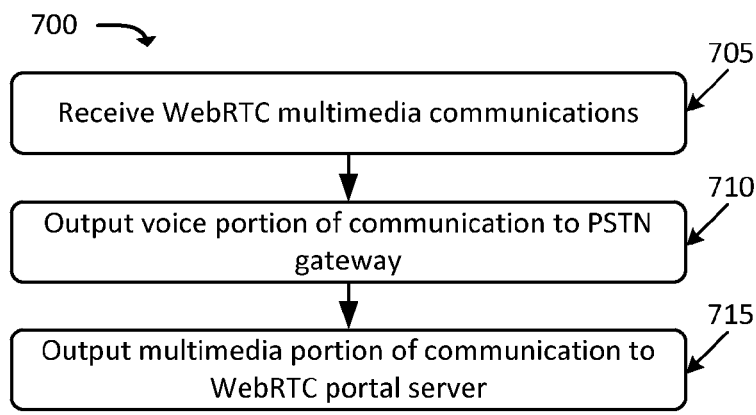
FIG. 7 illustrates an example process for splitting a WebRTC communication into a multimedia portion and a voice portion.

FIG. 7 illustrates an example process 700 for splitting a WebRTC communication into a multimedia portion and a voice portion. In one example implementation, process 700 may be performed by WebRTC-IMS gateway 235. For example, some or all of process 700 may be performed by voice/multimedia splitter/combiner 415 component of WebRTC-IMS gateway 235. In other implementations, some or all of process 700 may be performed by one or more other devices in lieu of, or in conjunction with, WebRTC-IMS gateway 235. For instance, in some implementations, WebRTC portal server 215 may perform some or all of process 700.

Process 700 may include receiving WebRTC multimedia communications (block 705). For example, as described above with respect to FIG. 4, WebRTC-IMS gateway 235 may receive a WebRTC multimedia communication, which may include video, audio, and/or other multimedia, from user device 205.

Process 700 may also include outputting a voice portion of the communication to a PSTN gateway (block 710). For example, as described above with respect to FIG. 4, WebRTC-IMS gateway 235 may split the multimedia communication (received at block 705) into a voice portion and a multimedia portion, and may output the voice portion to PSTN gateway 510.

Process 700 may additionally include outputting a multimedia portion of the communication to a WebRTC portal server (block 715). For example, as described above with respect to FIG. 4, WebRTC-IMS gateway 235 may output the multimedia portion to WebRTC portal server 215.

In some implementations, WebRTC-IMS gateway 235 may output the WebRTC communication (e.g., the entirety of the WebRTC communication received at block 705) to WebRTC portal server 215. For instance, assume that the received WebRTC communication includes voice and video portions. In some implementations, WebRTC-IMS gateway 235 may output (at block 715) both the voice and the video portions to WebRTC portal server 215. In some implementations, WebRTC-IMS gateway 235 may output the voice portion to PSTN gateway 510, and may output the video portion (with or without the voice portion) to WebRTC portal server 215.

Figure 8:
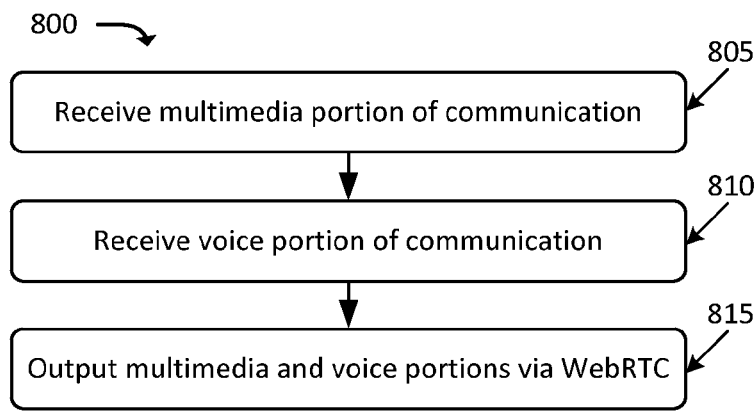
FIG. 8 illustrates an example process for combining a voice portion of a call and a multimedia portion of the call into a WebRTC communication.

FIG. 8 illustrates an example process 800 for combining a voice portion of a call and a multimedia portion of the call into a WebRTC communication. In one example implementation, process 800 may be performed by WebRTC-IMS gateway 235. For example, some or all of process 800 may be performed by voice/multimedia splitter/combiner 415 component of WebRTC-IMS gateway 235. In other implementations, some or all of process 800 may be performed by one or more other devices in lieu of, or in conjunction with, WebRTC-IMS gateway 235. For instance, in some implementations, WebRTC portal server 215 may perform some or all of process 800.

Process 800 may include receiving a multimedia portion of a communication (block 805). For instance, as described above with respect to FIG. 5, WebRTC-IMS gateway 235 may receive a WebRTC communication from, for example, a particular user device 205 or from WebRTC portal server 215. The multimedia portion of the communication (received at block 805) may include, for example, video and/or voice.

Process 800 may also include receiving a voice portion of a communication (block 810). For instance, as described above with respect to FIG. 5, WebRTC-IMS gateway 235 may receive a voice communication from PSTN gateway 510. The voice communication may correspond to the multimedia portion of the communication. That is, for instance, the voice communication may include, or be associated with, signaling information indicating that indicates that the voice communication is associated with the multimedia portion received at block 805.

Process 800 may additionally include outputting the multimedia and voice portions via WebRTC (block 815). For instance, as described above with respect to FIG. 5, WebRTC-IMS gateway 235 may combine the multimedia and voice portions received at blocks 805 and 810, respectively, into a single WebRTC communication, and output the WebRTC communication to, for example, user device 205 and/or WebRTC portal server 215. In some implementations, WebRTC-IMS gateway 235 may determine that the multimedia portion, received at block 805, includes a voice portion. In some such implementations, WebRTC-IMS gateway 235 may omit the voice portion received at block 810, when performing the outputting at block 815. In some such implementations, it may be unnecessary for WebRTC-IMS gateway 235 to perform a combining operation if the multimedia portion includes a voice portion, since the voice portion (received at block 810) may be redundant with the voice already included in the multimedia portion.

FIGS. 9-13 illustrate example call flows for calls between various types of callers. While these figures show examples of how the techniques described above may be implemented, in practice, other variations are possible. Furthermore, signals shown in FIG. 9 (e.g., STUN messaging between user device 205 and WebRTC-IMS gateway 235 and SIP messaging between CSCF 505 and PSTN gateway 510) are not illustrated in FIGS. 10-13 for the sake of simplicity. However, although these signals are not explicitly shown in FIGS. 10-13, these signals may be present in practice.

Additionally, for the purposes of conceptually describing certain devices as being associated with certain parties, some of these devices are illustrated in FIGS. 9-13 in a single block. For example, in FIGS. 9-13, PSTN terminal device 210 and user device 205-2 are illustrated within a single block. However, in practice, PSTN terminal device 210 and user device 205-2 may, in some implementations, be separate devices with no actual direct communication between one another. In some implementations, however, some of the devices that are illustrated within a single block may be integrated within a single device.

Figure 9:
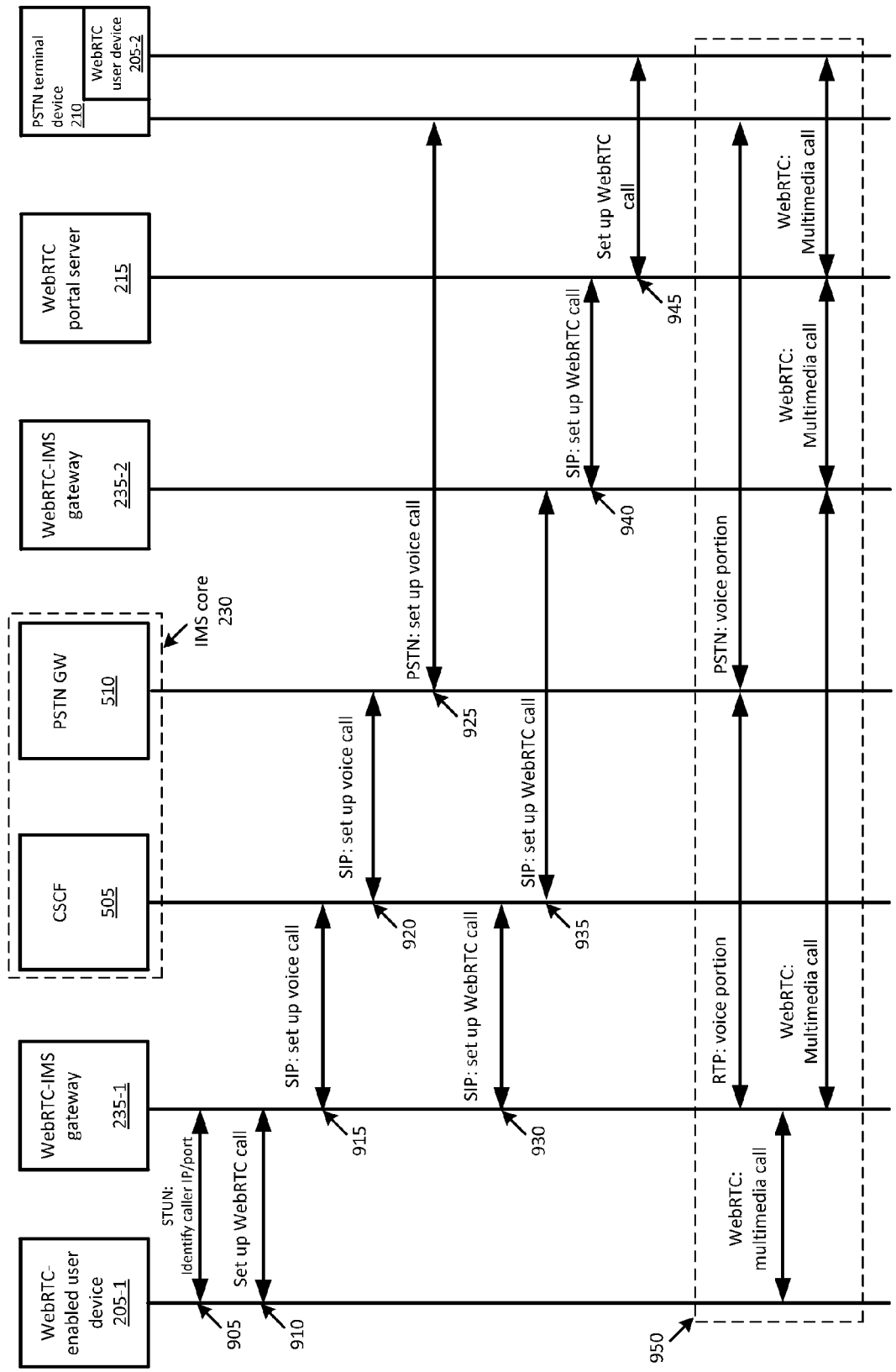
FIG. 9 illustrates an example call flow for a multimedia call between a WebRTC caller and a callee with a WebRTC component and a non-WebRTC component.

FIG. 9 illustrates an example call flow for a multimedia call when a call is initiated by a WebRTC-enabled calling device, to a callee with a WebRTC component and a non-WebRTC component. For example, the calling device may be a first user device 205 (shown in FIG. 9 as "WebRTC-enabled user device 205-1"), with WebRTC capabilities. For example, user device 205-1 may include software that implements a WebRTC API, in order to send and/or receive WebRTC multimedia communications.

The callee may be associated with a second user device (shown in FIG. 9 as "WebRTC user device 205-2"), which may also be WebRTC-capable. The callee may also be associated with PSTN terminal device 210. As described above with respect to FIG. 6, the callee may have previously registered with WebRTC portal server 215, in order to allow the callee to receive PSTN calls via PSTN terminal device 210, and corresponding multimedia calls via the callee's user device 205.

As shown in FIG. 9, user device 205 may output (at 905) a request, via a STUN protocol, for an externally-visible IP address and port associated with a WebRTC application of user device 205-1. In some implementations, user device 205-1 may output the request to a first WebRTC-IMS gateway (shown in FIG. 9 as "WebRTC-IMS gateway 235-1"). In other implementations, user device 205-1 may output the request to another device, or may forgo outputting the request at all (e.g., user device 205-1 may determine its own externally-visible IP address and port using some other technique). WebRTC-IMS gateway 235-1 may provide information back to user device 205 in response to the request, indicating the externally-visible IP address and port of the WebRTC application of user device 205-1.

As further shown, user device 205-1 may output (at 910), to WebRTC-IMS gateway 235-1, a request to establish a WebRTC call. In some implementations, the request may include a PSTN telephone number associated with the callee, and/or another identifier (e.g., an IP address, a URL, an email address, a user name, and/or another identifier). WebRTC-IMS gateway 235-1 may reply to the request, in order to establish a WebRTC session with user device 205-1.

WebRTC-IMS gateway 235-1 may output (at 915) a request to IMS core 230 (specifically, in some implementations, to CSCF 505), requesting that a voice call session be established between WebRTC-IMS gateway 235 and PSTN gateway 510. In some implementations, this request may be in the form of an SIP INVITE message, and may indicate that the intended recipient of the voice call is PSTN terminal device 210. Based on receiving the message (at 915), CSCF 505 may output a message (e.g., an SIP INVITE message) to PSTN gateway 510, indicating that PSTN signals received from PSTN terminal device 210 should be translated and forwarded to WebRTC-IMS gateway 235-1, and that voice signals received from WebRTC-IMS gateway 235-1 should be translated and forwarded to PSTN terminal device 210.

Based on the setup message received at 920, PSTN gateway 510 may output (at 925) a signal to PSTN terminal device 210, to initiate a voice call between IMS core 230 (or, more specifically, in some implementations, PSTN gateway 510) and PSTN terminal device 210. This message may, in some implementations, cause PSTN terminal device 210 to ring.

WebRTC-IMS gateway 235-1 may also output (at 930) a request to set up a WebRTC call. While shown in FIG. 9 as separate messages, in some implementations, the requests at 915 and 930 may be sent as a single message. Based on the request (at 930), CSCF 505 may identify another WebRTC-IMS gateway (WebRTC-IMS gateway 235-2), with which WebRTC-IMS gateway 235-1 should communicate via WebRTC. For instance, WebRTC-IMS gateway 235-2 may be connected to, or associated with, network hardware, of IMS core 230, via which communications will be routed to and/or from user device 205-2.

Based on this determination, CSCF 505 may output (at 940) a message to WebRTC-IMS gateway 235-2, indicating that a WebRTC call session should be established between WebRTC-IMS gateway 235-1 and WebRTC-IMS gateway 235-2. This message may further indicate that the WebRTC call session is associated with the voice call (established at 925). As further shown, based on the request received at 940, WebRTC-IMS gateway 235-2 may output a request to WebRTC portal server 215 to establish a WebRTC call. Based on this request, WebRTC portal server 215 may output (at 945) a request to establish a WebRTC call between WebRTC portal server 215 and user device 205-2. For instance, WebRTC portal server 215 may send a message to user device 205-2 (e.g., an email, an instant message, or another type of message) to user device 205-2 and/or another device associated with the callee.

In some implementations, a web browser of user device 205-2 may display a web page provided by WebRTC portal server 215. As mentioned above, this web page may include client-side code that interacts with server-side code that is executed by WebRTC portal server 215. In some such implementations, as part of establishing (at 945) the WebRTC call, WebRTC portal server 215 may present, via the web page, an indication that a WebRTC call, associated with the incoming PSTN call (at 925), is incoming. This presentation may include, for instance, a selectable graphical option (e.g., a button) being made available on the web page.

Once the voice portion of the call is established between WebRTC-IMS gateway 235-1 and PSTN terminal device 210 (at, for example, 915-925) and the WebRTC call is established between WebRTC-IMS gateway 235-1 and user device 205-2 (at, for example, 930-945), a conceptual end-to-end enhanced call between user device 205-1 and the callee's devices (user device 205-2 and PSTN terminal device 210) may be considered to be established (at 950—indicated in FIG. 9 with a dashed line). As shown in the figure, once enhanced call 950 is established, user device 205-1 may send and/or receive WebRTC communications that are directed to and/or are received from user device 205-2 and/or PSTN terminal device 210. Similarly, user device 205-2 may receive some or all of the portions of the multimedia communications sent from user device 205-1, and PSTN terminal device 210 may receive a voice portion of the multimedia communications sent from user device 205-1.

Figure 10:
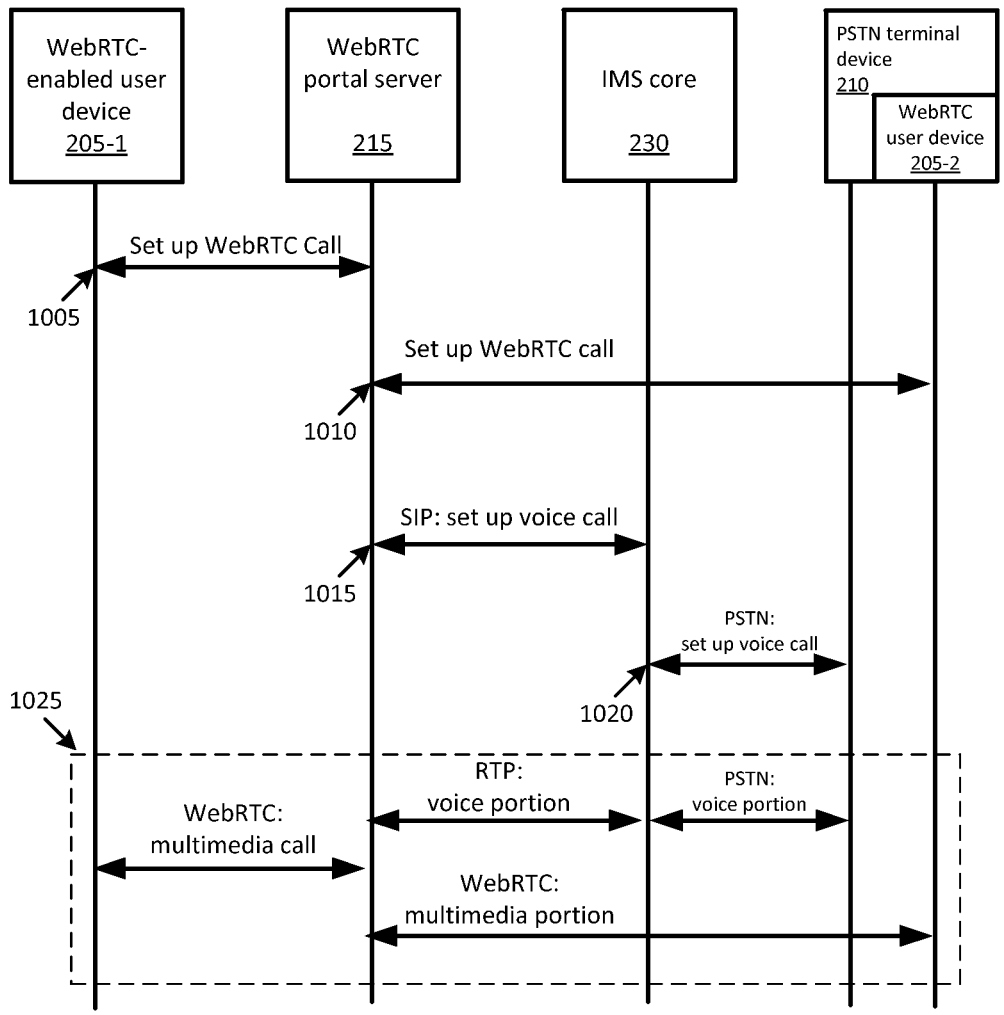
FIG. 10 illustrates another example call flow for a multimedia call between a WebRTC caller and a callee with a WebRTC component and a non-WebRTC component.

FIG. 10 illustrates another example call flow for a multimedia call from a WebRTC caller, to a callee with a WebRTC component and a non-WebRTC component. The call flow shown in FIG. 10 may, in some ways, be similar to the call flow shown in FIG. 9. One difference between these call flows is that WebRTC-IMS gateways may be eliminated, and user devices 205-1 and 205-2 may communicate, via WebRTC, with WebRTC portal server 215 directly.

As shown, user device 205-1 may establish (at 1005) a WebRTC call with WebRTC portal server 215, which may, in turn, establish (at 1010) a WebRTC call with user device 205-2. WebRTC portal server 215 may also, as shown, output (at 1015) a request to IMS core 230 to set up a voice call. Based on this request, IMS core 230 may establish (at 1020) a PSTN voice call with PSTN terminal device 210. Once the WebRTC call is established between WebRTC portal server 215 and user device 205-2 (at, for example, 1010), and the voice call is established between WebRTC portal server 215 and user device 205-2 (at, for example, 1015-1020), a conceptual end-to-end enhanced call between user device 205-1 and the callee's devices (user device 205-2 and PSTN terminal device 210) may be considered to be established (at 1025—indicated in FIG. 10 with a dashed line).

Figure 11:
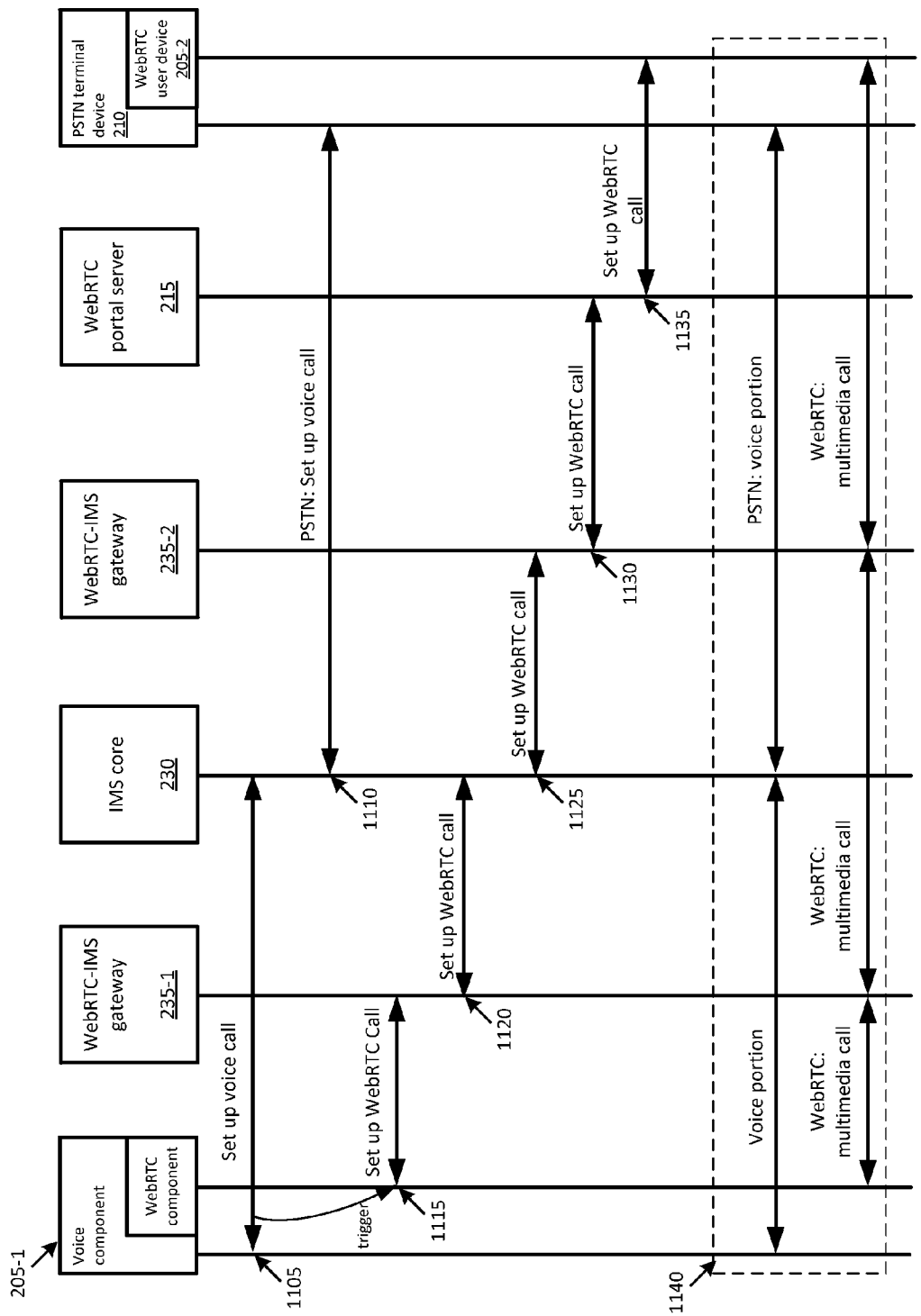
FIG. 11 illustrates an example call flow for a multimedia call between a caller, with a WebRTC component and a non-WebRTC component, and a callee with a WebRTC component and a non-WebRTC component.

FIG. 11 illustrates an example call flow for a multimedia call from a caller, with a WebRTC component and a non-WebRTC component, to a callee with a WebRTC component and a non-WebRTC component. As shown, the caller's user device (user device 205-1) may include a voice component and a WebRTC component. The voice component may correspond to, for example, voice call component 305 (shown in FIG. 3), and the WebRTC component may correspond to WebRTC component 310 (also shown in FIG. 3).

The voice component of user device 205-1 may output (at 1105) a request to establish a voice call. For instance, a user may have dialed a PSTN telephone number associated with PSTN terminal device 210. The call request may be received by IMS core 230, which may establish (at 1110) a PSTN call with PSTN terminal device 210. As further shown, the voice call request, from user device 205-1, may trigger the WebRTC component of user device 205-1 to request (at 1115) the establishment of a WebRTC call. Signals 1120-1135 may be similar to signals 930-945, shown in FIG. 9. Briefly, signals 1120-1135 may correspond to the establishment of WebRTC call channels that allow WebRTC communications to be communicated between WebRTC-IMS gateway 235-1 and user device 205-2. Once the WebRTC call is established between WebRTC-IMS gateway 235-1 and user device 205-2 (at, for example, 1120-1135), and the voice call is established between user device 205-1 and PSTN terminal device 210 (at, for example, 1105-1110), a conceptual end-to-end enhanced call between user device 205-1 and the callee's devices (user device 205-2 and PSTN terminal device 210) may be considered to be established (at 1140—indicated in FIG. 11 with a dashed line).

Figure 12:
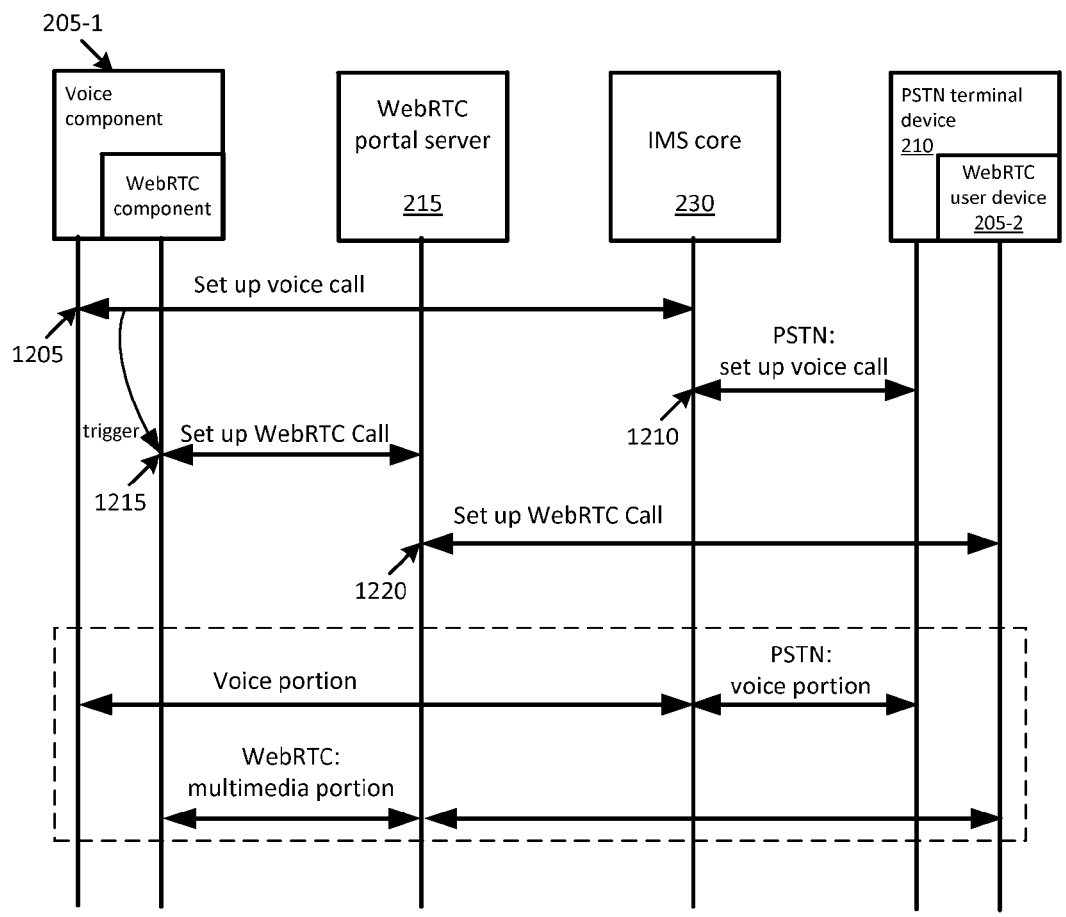
FIG. 12 illustrates another example call flow for a multimedia call between a caller, with a WebRTC component and a non-WebRTC component, and a callee with a WebRTC component and a non-WebRTC component.

FIG. 12 illustrates another example call flow for a multimedia call from a caller, with a WebRTC component and a non-WebRTC component, to a callee with a WebRTC component and a non-WebRTC component. As shown, user device 205-1 may output (at 1205) a voice call request to IMS core 230, which may establish (at 1210) a PSTN voice call with PSTN terminal device 210. The voice call request (at 1205) may trigger the WebRTC component of user device 205-1 to request (at 1215) a WebRTC call to WebRTC portal server 215, which may establish (at 1220) a WebRTC call with user device 205-2. Thus, in the example implementation shown in this figure, the use of a WebRTC-IMS gateway may be eliminated, and user devices 205 may communicate directly with WebRTC portal server 215 (e.g., via PDN 225, without WebRTC communications traversing IMS core 230).

Figure 13:
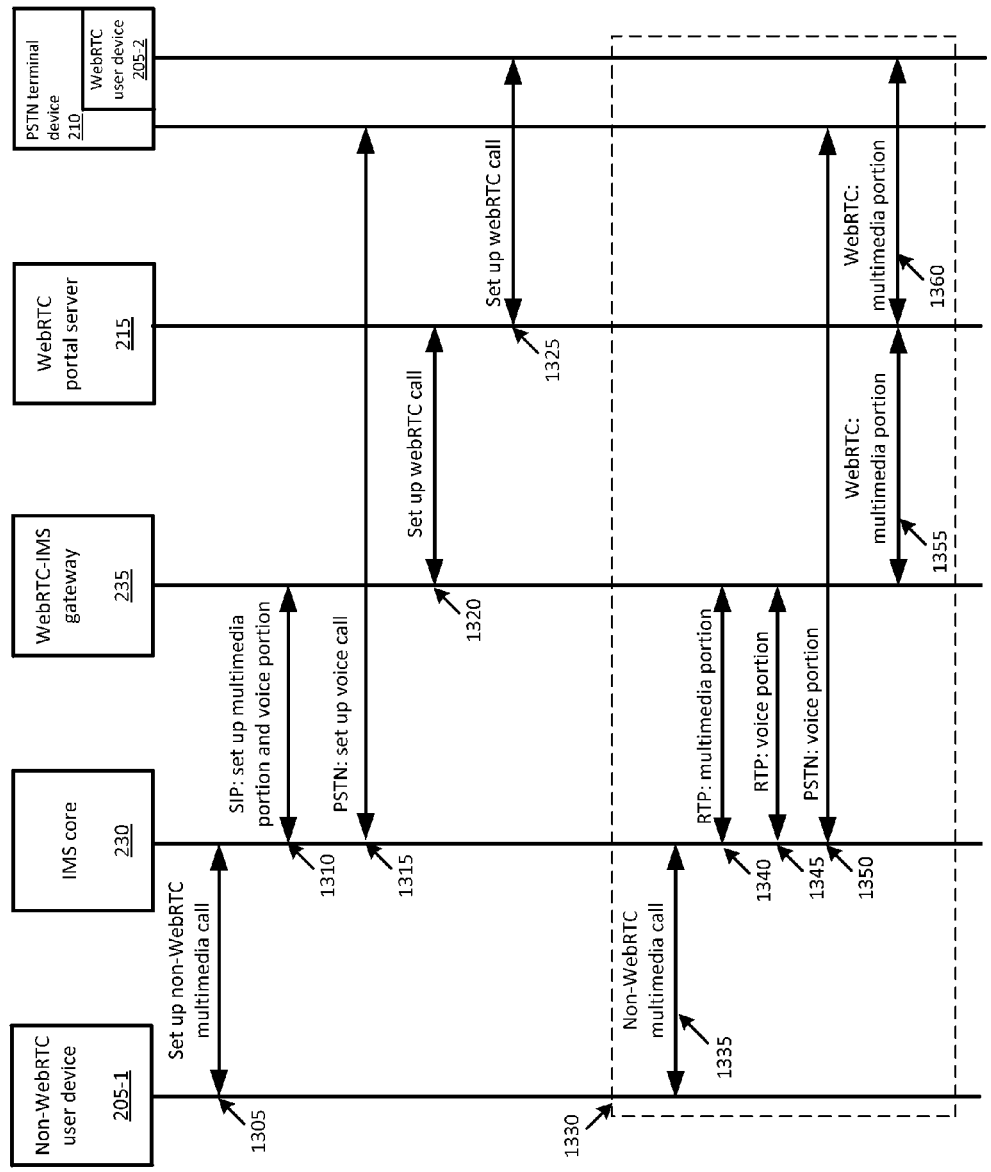
FIG. 13 illustrates another example call flow for a multimedia call between a non-WebRTC caller and a callee with a WebRTC component and a non-WebRTC component.

FIG. 13 illustrates an example call flow for a multimedia call from a non-WebRTC caller to a callee with a WebRTC component and a non-WebRTC component. As shown, user device 205-1 may place (at 1305) a multimedia call. In this example, the multimedia call may not be a WebRTC call. For instance, the multimedia call may be a video and voice call using an over the top ("OTT") multimedia call application.

IMS core 230 may establish (at 1310) a corresponding call session with WebRTC-IMS gateway 235, via which multimedia communications, associated with the call, may be transmitted between IMS core 230 and WebRTC-IMS gateway 235. In some implementations, WebRTC-IMS gateway 235 may determine that an enhanced multimedia call is being made (e.g., a call that should be split into voice and multimedia portions), and may output (at 1210) a request to IMS core 230 to establish a voice call session.

Based on the request (at 1310), IMS core 230 may establish (at 1215) a PSTN voice call with PSTN terminal device 210. Also based on the request (at 1310), WebRTC-IMS gateway 235 may establish (at 1320) a corresponding WebRTC session with WebRTC portal server 215. As described above, WebRTC-IMS gateway 235 may facilitate communications between WebRTC portal server 215 and IMS core 230 by translating communications from WebRTC to communication techniques supported by IMS core 230 (e.g., RTP), and vice versa. In turn, WebRTC portal server 215 may establish (at 1325) a WebRTC call with user device 205-2.

Once the WebRTC call is established between WebRTC-IMS gateway 235 and user device 205-2 (at, for example, 1320-1325), and the voice call is established between WebRTC-IMS gateway 235 and PSTN terminal device 210 (at, for example, 1310-1315), a conceptual end-to-end enhanced call between user device 205-1 and the callee's devices (user device 205-2 and PSTN terminal device 210) may be considered to be established (at 1330—indicated in FIG. 13 with a dashed line). For instance, assume that user device 205-1 sends (at 1335) non-WebRTC multimedia communications to IMS core 230, which may forward (at 1340) the multimedia communication to WebRTC-IMS gateway 235. WebRTC-IMS gateway 235 may forward (at 1345) a voice portion of the communication to IMS core 230, which may forward (at 1350) the voice portion to PSTN terminal device 210 via PSTN 240. WebRTC-IMS gateway 235 may also forward (at 1355) a multimedia portion of the communication to WebRTC portal server 215 via WebRTC, which may forward (at 1360) the WebRTC multimedia portion to user device 205-2.

As another example, assume that communications are received from the callee's devices 205-2 and 210. For example, PSTN terminal device 210 may output (at 1350) a voice communication to IMS core 230 via PSTN, and user device 205-2 may output (at 1360) a WebRTC multimedia communication to WebRTC portal server 215. IMS core 230 may forward (at 1345) the voice portion to WebRTC-IMS gateway 235, and WebRTC portal server 215 may forward (at 1355) the multimedia portion to WebRTC-IMS gateway 235. WebRTC-IMS gateway 235 may appropriately combine the voice and multimedia portions (e.g., as described above), and forward (at 1340) the combined multimedia communication to IMS core 230. In turn, IMS core 230 may output (at 1335) the combined multimedia portion to user device 205-1.

Figure 14:
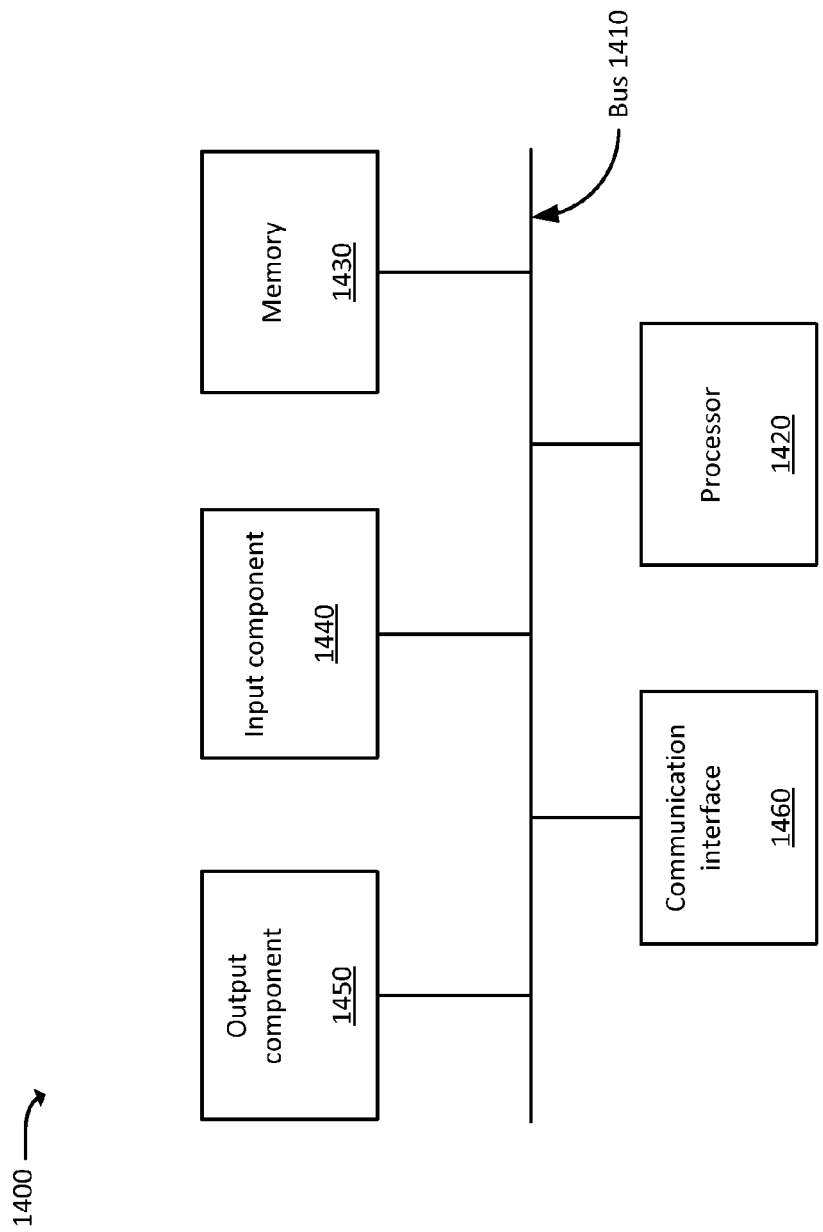
FIG. 14 illustrates example components of one or more devices, according to one or more implementations described herein.

FIG. 14 is a diagram of example components of device 1400. One or more of the devices illustrated in FIGS. 1-5 and 9-13 may include one or more devices 1400. Device 1400 may include bus 1410, processor 1420, memory 1430, input component 1440, output component 1450, and communication interface 1460. In another implementation, device 1400 may include additional, fewer, different, or differently arranged components.

Bus 1410 may include one or more communication paths that permit communication among the components of device 1400. Processor 1420 may include a processor, microprocessor, or processing logic that may interpret and execute instructions. Memory 1430 may include any type of dynamic storage device that may store information and instructions for execution by processor 1420, and/or any type of non-volatile storage device that may store information for use by processor 1420.

Input component 1440 may include a mechanism that permits an operator to input information to device 1400, such as a keyboard, a keypad, a button, a switch, etc. Output component 1450 may include a mechanism that outputs information to the operator, such as a display, a speaker, one or more light emitting diodes ("LEDs"), etc.

Communication interface 1460 may include any transceiver-like mechanism that enables device 1400 to communicate with other devices and/or systems. For example, communication interface 1460 may include an Ethernet interface, an optical interface, a coaxial interface, or the like. Communication interface 1460 may include a wireless communication device, such as an infrared ("IR") receiver, a Bluetooth radio, or the like. The wireless communication device may be coupled to an external device, such as a remote control, a wireless keyboard, a mobile telephone, etc. In some embodiments, device 1400 may include more than one communication interface 1460. For instance, device 1400 may include an optical interface and an Ethernet interface.

Device 1400 may perform certain operations relating to one or more processes described above. Device 1400 may perform these operations in response to processor 1420 executing software instructions stored in a computer-readable medium, such as memory 1430. A computer-readable medium may be defined as a non-transitory memory device. A memory device may include space within a single physical memory device or spread across multiple physical memory devices. The software instructions may be read into memory 1430 from another computer-readable medium or from another device. The software instructions stored in memory 1430 may cause processor 1420 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while series of blocks have been described with regard to FIGS. 6-8, the order of the blocks may be modified in other implementations. Further, non-dependent blocks may be performed in parallel.

Also, while FIGS. 9-13 illustrate example signal flow diagrams, in practice, variations of the illustrated examples are possible. For instance, in some implementations, fewer, additional, or different signals may be transmitted, as compared to those shown in the example signal flow diagrams. For example, additional signals may be transmitted before, after, or in between the example illustrated signals.

Additionally, while example implementations are described above in the context of WebRTC, in practice, other services, protocols, and/or APIs may be implemented using similar techniques. For instance, in addition to, or in lieu of, the WebRTC API, some implementations may use a different standard, API, or protocol altogether in order to implement multimedia communications. Furthermore, term "voice," as used in this document, may refer to any audio that may or may not actually include a user's voice. Additionally, the term "multimedia," as used in this document, may refer to a single type of media, such as video only.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items, and may be used interchangeably with the phrase "one or more." Where only one item is intended, the term "one" or similar language is used. Further, the phrase "based on" is intended to mean "based, at least in part, on" unless explicitly stated otherwise.

What is claimed is:

1. A method, comprising:
   receiving, by a gateway device and from a first user device, a request to establish a Web Real-Time Communications ("WebRTC") call session;
   establishing, by the gateway device and based on the request, a first WebRTC call session with the user device;
   establishing, based on the request, a voice call session between the gateway device and an Internet Protocol Multimedia Subsystem ("IMS") core;
   establishing, based on the request, a second WebRTC call session between the gateway device and a WebRTC portal server; and
   facilitating, by the gateway device and via the established voice call session and the established first and second WebRTC call sessions, multimedia communication connectivity between the first user device and a set of devices that include:
   a public-switched telephone network ("PSTN") terminal device, and a second user device.

2. The method of claim 1, wherein the facilitating includes:
receiving a WebRTC multimedia communication from the first user device;
outputting an audio portion of the received multimedia communication to the IMS core; and
outputting a multimedia portion of the received multimedia communication to the WebRTC portal server.

3. The method of claim 1, wherein the request includes information identifying the callee, wherein establishing the voice call session includes outputting a control message to the IMS core,
wherein the control message includes the information identifying the callee in a manner that indicates that an intended recipient, of communications sent over the voice call session, is the callee.

4. The method of claim 3, wherein the information identifying the callee includes a PSTN telephone number associated with the callee.

5. The method of claim 3, wherein the control message includes a Session Initiation Protocol ("SIP") INVITE message.

6. The method of claim 1, wherein the facilitating includes:
receiving a multimedia communication from the WebRTC portal server;
receiving an audio communication from the IMS core;
generating a WebRTC communication based on the received multimedia communication and the received audio communication; and
outputting the generated WebRTC communication to the first user device.

7. The method of claim 6, wherein generating the WebRTC communication based on the received multimedia communication and the received audio communication comprises:
combining the audio communication with at least a portion of the multimedia communication.

8. The method of claim 7, wherein combining the audio communication with at least the portion of the multimedia communication includes:
syncing audio, associated with the audio communication, with video associated with the multimedia communication.

9. The method of claim 6, wherein generating the WebRTC communication based on the received multimedia communication and the received audio communication comprises:
determining that the multimedia communication includes audio; and
omitting the audio communication when generating the WebRTC communication.

10. The method of claim 1, wherein the facilitating allows the PSTN terminal device and the second user device to each simultaneously receive at least a respective portion of multimedia communications output by the first device.

11. A gateway device, comprising:
a memory device storing a set of computer-executable instructions; and
one or more processors configured to execute the computer-executable instructions, wherein executing the computer-executable instructions causes the one or more processors to:
receive, from a first user device, a request to establish a Web Real-Time Communications ("WebRTC") call session;
establish, based on the request, a first WebRTC call session with the first user device;
establish, based on the request:
a voice call session between the gateway device and an Internet Protocol Multimedia Subsystem ("IMS") core, and
a second WebRTC call session between the gateway device and a WebRTC portal server; and
facilitate, via the established voice call session and the established first and second WebRTC call sessions, multimedia communication connectivity between the first user device and a set of devices that include:
a public-switched telephone network ("PSTN") terminal device, and
a second user device.

12. The gateway device of claim 11, wherein executing the instructions, which cause the one or more processors to facilitate the multimedia connectivity, further cause the one or more processors to:
output an audio portion of a WebRTC multimedia communication, received from the first user device, to the IMS core; and
output a multimedia portion of the received WebRTC multimedia communication to the WebRTC portal server.

13. The gateway device of claim 11, wherein the request includes information identifying the callee, wherein establishing the voice call session includes outputting a control message to the IMS core,
wherein the control message includes the information identifying the callee in a manner that indicates that an intended recipient, of communications sent over the voice call session, is the callee.

14. The gateway device of claim 13, wherein the information identifying the callee includes a PSTN telephone number associated with the callee.

15. The gateway device of claim 11, wherein executing the instructions, which cause the one or more processors to facilitate the multimedia connectivity, further cause the one or more processors to:
generate a WebRTC communication based on:
a multimedia communication received from the WebRTC portal server, and
an audio communication received from the IMS core; and
output the generated WebRTC communication to the first user device.

16. The gateway device of claim 11, wherein the facilitating allows the PSTN terminal device and the second user device to each simultaneously receive at least a respective portion of multimedia communications output by the first device.

17. A non-transitory computer-readable medium, comprising:
a plurality of computer-executable instructions stored thereon, which when executed by one or more processors of a gateway device, cause the one or more processors to:
receive, from a first user device, a request to establish a Web Real-Time Communications ("WebRTC") call session, the request being made by the first user device based on a voice call placed by the first user device to a callee;
establish, based on the request, a WebRTC call session with the first user device; and
facilitate multimedia communication connectivity between the first user device and a set of devices associated with the callee, the set of devices including:
a public-switched telephone network ("PSTN") terminal device, and a second user device,
the facilitating including allowing the PSTN terminal device and the second user device to each simultaneously receive at least a respective portion of multimedia communications output, via the WebRTC call session, by the first device,
wherein the plurality of computer-executable instructions, which cause the one or more processors to facilitate the multimedia connectivity, further cause the one or more processors to:
output an audio portion of a WebRTC multimedia communication, received from the first user device, to an Internet Protocol Multimedia Subsystem ("IMS") core, wherein the IMS core outputs the audio portion to the PSTN terminal device; and
output a multimedia portion of the received WebRTC multimedia communication to a WebRTC portal server, wherein the WebRTC portal server outputs the multimedia portion to the second user device.

18. The non-transitory computer-readable medium of claim 17, wherein executing the instructions, which cause the one or more processors to facilitate the multimedia connectivity, further cause the one or more processors to:
generate a WebRTC communication based on:
a multimedia communication received from the WebRTC portal server, and
an audio communication received from the IMS core; and
output the generated WebRTC communication to the first user device via the WebRTC call session.

19. A non-transitory computer-readable medium, comprising:
a plurality of computer-executable instructions stored thereon, which when executed by one or more processors of a gateway device, cause the one or more processors to:
receive, from a first user device, a request to establish a Web Real-Time Communications ("WebRTC") call session, the request being made by the first user device based on a voice call placed by the first user device to a callee;
establish, based on the request, a first WebRTC call session with the first user device;
facilitate multimedia communication connectivity between the first user device and a set of devices associated with the callee, the set of devices including:
a public-switched telephone network ("PSTN") terminal device, and
a second user device,
the facilitating including allowing the PSTN terminal device and the second user device to each simultaneously receive at least a respective portion of multimedia communications output, via the WebRTC first call session, by the first device; and
establish, based on the request:
a voice call session between the gateway device and an Internet Protocol Multimedia Subsystem ("IMS") core, and
a second WebRTC call session between the gateway device and a WebRTC portal server;
wherein the facilitating further includes facilitating multimedia communication connectivity via the voice call session and the second WebRTC call session.

20. The non-transitory computer-readable medium of claim 19, wherein the request includes information identifying the callee, wherein the computer-executable instructions, to establish the voice call session, include the computer-executable instructions to output a control message to the IMS core,
wherein the control message includes the information identifying the callee in a manner that indicates that an intended recipient, of communications sent over the voice call session, is the callee.

* * * * *